3,059,892
HIGH TEMPERATURE PILOT CONTROL VALVE
Richard T. Windsor, Erie, Pa., assignor to Hays Manufacturing Company, Erie, Pa., a corporation of Pennsylvania
Filed July 16, 1959, Ser. No. 827,502
2 Claims. (Cl. 251—38)

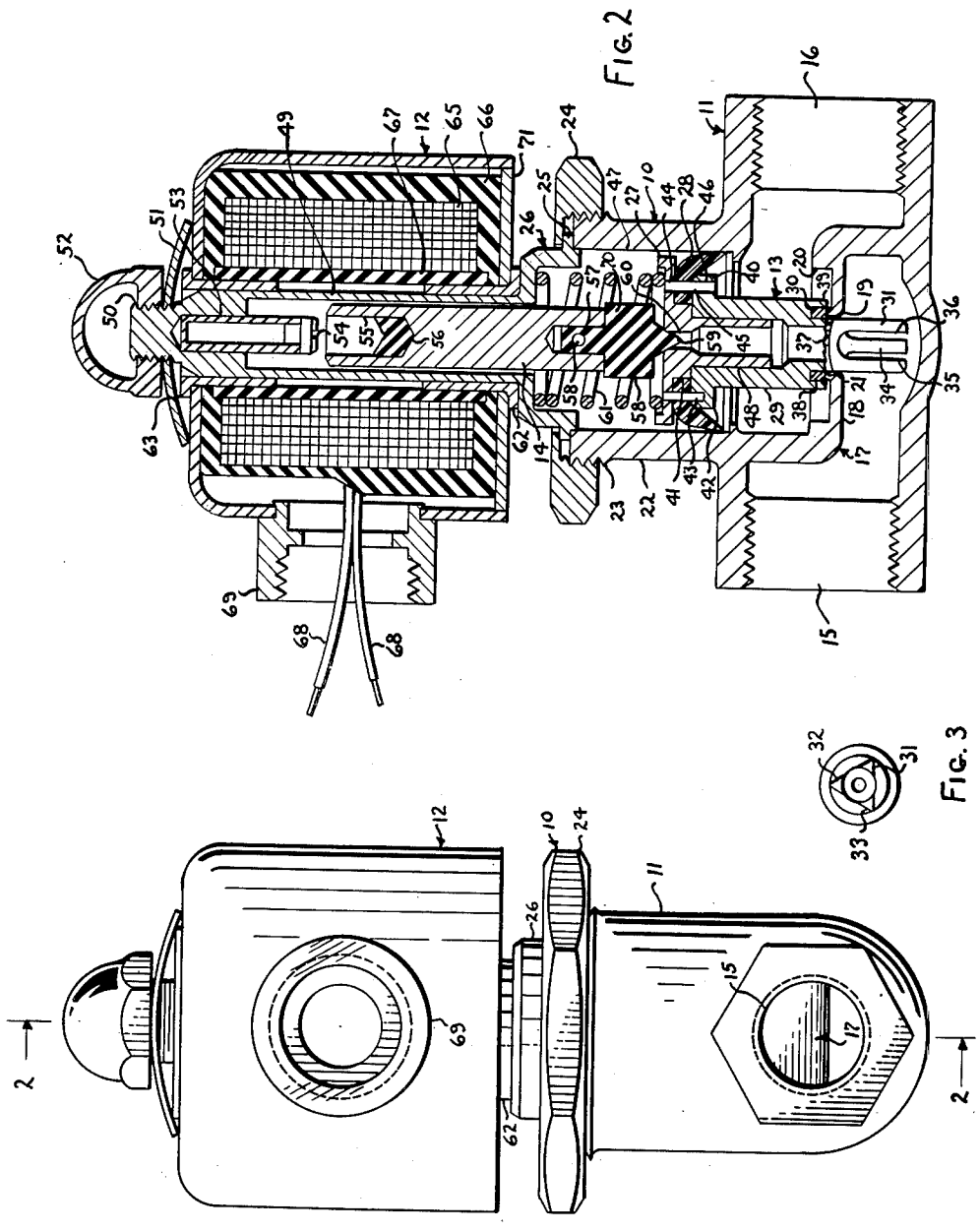
Oct. 23, 1962  R. T. WINDSOR  3,059,892
HIGH TEMPERATURE PILOT CONTROL VALVE
Filed July 16, 1959
INVENTOR.
Richard T. Windsor
BY Charles L. Lovercheck
ATTORNEY

United States Patent Office 3,059,892
Patented Oct. 23, 1962

This invention relates to valves and, more particularly, to pilot controlled valves suitable for use in controlling liquids at relatively high temperatures.

The valve disclosed herein is provided with an improved construction of piston which makes it especially suitable for controlling liquids at elevated temperatures such as very hot water.

It is, accordingly, an object of the present invention to provide an improved pilot control valve having an improved piston therein.

Another object of the invention is to provide an improved piston in combination with a pilot control valve.

A further object of the invention is to provide an improved piston and shut off means in a pilot control valve.

Still a further object of the invention is to provide an improved piston which will operate in the presence of high concentrations of dirt, sand, or other foreign matter in the fluid being controlled.

Yet a further object of the invention is to provide a pilot control valve which is simple in construction, economical to manufacture, and simple and efficient in use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an end view of a pilot control valve according to the invention;

FIG. 2 is a cross sectional view taken on line 2—2 of FIG. 1; and

FIG. 3 is a bottom view of the piston of the device.

Now with more specific reference to the drawing, FIG. 1 shows a pilot control valve 10 having a body 11 with a solenoid 12 supported thereon. The body 11 contains a piston 13. A plunger 14 is disposed in the solenoid 12 and it extends down into the body 11 of the valve 10.

The body 11 of the valve 10 may be made of a suitable forging, casting, or molding of brass or other suitable material or it could be made of a molded plastic. The body 11 has a threaded inlet 15 and a threaded outlet 16 suited for attaching the valve 10 to a suitable fluid line. A partition 17 is integrally attached to the body 11 and extends across the opening therethrough and has an axially extending portion 18 with an opening 19 therein. The opening 19 has a groove 20 formed therearound concentric thereto. The groove 20 leaves a ridge 21 around the opening 19 to provide a seat for a washer 30 thereon.

The body 11 has an upwardly extending boss 22 integrally attached thereto which is externally threaded at 23 to receive a coupling nut 24. The coupling nut 24 has an inwardly directed flange which engages an outwardly directed peripheral shoulder 25 on an adapter bonnet 26 and thereby holds the adapter bonnet 26 in position.

The piston 13 is made of four parts which are a plunger seat 27, a piston ring 28, a piston body 29, and the seat washer 30. The lower end of the piston 13 is of reduced size and has three flat sides 31, 32, and 33 which define the sides of a prism triangular in cross sectional shape. The flat sides 31, 32, and 33 are intersected by the cylindrical axial bore in the center. This forms three slots 34, 35, and 36 therein. The upper ends of the slots 34, 35, and 36 are arcuate and, therefore, stop the flow of fluid gradually as the valve 10 closes. The triangular prism shaped end is a continuation of a cylindrical reduced size portion 37 which defines the inside of a groove 38. The edges where the flat sides 31, 32, and 33 join form line contact with the inside surface of the opening 19.

The groove 38 is cut in a shoulder 39 in the intermediate end of the piston 13. The groove 38 receives the washer 30 which may be made of lead material. When the washer 30 is made of lead material, it will withstand the flow of liquids of elevated temperatures considerably higher than any other material which has been known for use in a valve seat.

The intermediate portion of the piston 13 is generally cylindrical in shape and has an integral outwardly directed peripheral flange 40 in the upper end thereof. The flange 40 defines a flat, upwardly directed surface which supports the piston ring 28. The piston ring 28 is in the form of a cup like washer having an opening 41 in the center thereof which receives the intermediate portion of the seat 27. The intermediate stepped portion is cylindrical and fits snugly inside the opening 41 and terminates at its lower end in a shoulder 42 which rests on the upper surface of the piston 13.

The seat 27 has an outwardly directed flange on the upper end thereof which rests on top of the ring 28. A pin 43 is driven through the seat 27 and into the piston 13 to hold the seat 27 and the piston 13 in alignment against rotation so that bleed openings 44, 45, and 46 in the piston 13, seat 27, and washer 30, respectively, will be aligned to form the pilot orifice for the chamber above the piston 13. The piston ring 28 has an outwardly and downwardly directed flange portion which forms a seal with an inside bored surface 47 of the boss.

The seat 27 has a reduced size lower end portion 48 which is cylindrical and which forms a press fit in the piston 13 so that when the seat 27 is pressed in the piston 13 with the piston ring 28 between the seat 27 and the flange 40, the piston ring 28 is clamped firmly therebetween. Then when the pin 43 is driven thereinto as mentioned, the pilot openings will be held in alignment. Therefore, the seat 27, piston 13, and piston ring 28 move up and down freely in the bored surface 47 with the lower ends of the piston 13 moving up and down in the opening 19 so that the washer 30 is brought into and out of engagement with the ridge or seat 21.

A coil 65 terminates in leads 68 to be connected to a suitable source of electricity. The coil 65 is housed in the solenoid cover made of magnetic material which has a threaded connector 69 attached thereto. The coil 65 is molded into a plastic envelope 66. Non-magnetic core ferrules 62 and 63 are supported on a hollow portion 49. The lower end of the solenoid cover is closed by a bottom washer 71 made of magnetic material.

Since the piston ring 28 is made of Teflon material and the Teflon material has a self-lubricating property at high temperatures, this, therefore, makes the valve operable at considerably higher temperatures than do other materials. This, in combination with the lead material used in the seat, makes the valve usable at extremely elevated meter temperatures.

The adapter bonnet 26 has the shoulder 25 thereon which is clamped between the coupling nut 24 and the upper end of the boss 22. The shoulder 25 is attached to the reduced size nonmagnetic hollow portion 49 which receives the upper end of the plunger 14. The upper end of the adapter bonnet 26 is solid and terminates in a reduced size threaded portion 50 which receives a "Belleville" washer 51. The washer 51 in turn urges the solenoid 12 downward and holds it firmly against the lower end of the adapter bonnet 26 to prevent hum and the like.

A nut 52 is tightened on the upper end of the threaded portion 50 to lock the washer 51 in position. A shading coil 53 is pressed into the reduced size bore in the upper end of the adapter bonnet 26 and it has a plug 54 in the lower end thereof. The plug 54 and the shading coil 53 fit into a bore 55 in the upper end of the plunger 14 and engage resilient material 56 in the bottom thereof and absorb violent impact.

The plunger 14 is generally cylindrical in shape and it loosely fits into the bore in the adapter bonnet 26 and freely moves upwardly and downwardly therein. The plunger 14 has a bore 57 in the lower end thereof which receives the upper reduced size end of a head 70. The head 70 may be made of any good flexible, fairly resilient plastic material, for example, a good grade of rubber or plastic, and it is held in the bore 57 by means of a pin 58. The pin 58 extends through the lower end of the plunger 14 and through the reduced size portion on the head 70.

The head 70 has a conical point 59 which engages and extends into a central bore 60 in the plunger seat 27 and closes this when in the down position. The central bore 60 extends completely through the piston 13. A spring 61 is disposed around the plunger 14 and its upper end rests on the inner surface of the adapter bonnet 26 and the lower end rests on the upper surface of the plunger seat 27. A cylindrical ferrule 62 having an outwardly directed flange is supported on the outside of the bonnet adapter 26.

The foregoing specification sets forth the invention in its preferred practical form but it is understood that the structure shown is capable of modification within a range of equivalents without departing from the invention which is to be understood is as broadly novel as is commensurate with the appended claims.

The embodiments of the invention in which an exclusive property or privilege is claimed are defined as follows:

1. A pilot operated valve comprising a body having an inlet and an outlet therein, a partition in said body separating said inlet from said outlet, an opening in said partition, a piston having an annular lead sealing member adapted to engage said partition around said opening and seal around said opening in said partition when said piston is in closed position, a cylinder attached to said body and receiving said piston, said cylinder defining a closure above said piston, a pilot opening in said piston, a pilot member for closing and selectively opening said pilot opening in said piston connecting said cylinder with said outlet, and a bleed opening in said piston connecting said cylinder with said inlet, said piston having a piston ring comprising a cup shaped washer in said cylinder slidable therewith forming sealing engagement therewith, said cup shaped washer opening toward said inlet, said piston ring being made of a synthetic plastic material, the lower end of said piston having outwardly extending edges constituting line contact guides whereby said piston will not bind in the seat in the presence of dirt or other foreign matter, the center of said piston being bored, said bore intersecting slots to form passages whereby fluid flow will be stopped gradually when said piston moves from an open to a closed position.

2. The valve recited in claim 1 wherein a spring is supported on top of said piston on one end thereof and inside said cylinder on the other end thereof, urging said piston toward closed position.

References Cited in the file of this patent
UNITED STATES PATENTS

| | | |
|---|---|---|
| 45,390 | Cresson | Dec. 13, 1864 |
| 862,967 | Hawkyard | Aug. 13, 1907 |
| 1,099,389 | Morrison | June 9, 1914 |
| 1,172,474 | Madigan | Feb. 22, 1916 |
| 1,250,388 | Titus | Dec. 18, 1917 |
| 2,694,544 | Hall | Nov. 16, 1954 |
| 2,701,119 | Smith | Feb. 1, 1955 |
| 2,843,434 | Orloff | July 15, 1958 |
| 2,851,244 | Monson | Sept. 9, 1958 |
| 2,877,071 | Arnot | Mar. 10, 1959 |
| 2,888,233 | Windsor | May 26, 1959 |

FOREIGN PATENTS

| | | |
|---|---|---|
| 138,126 | Sweden | 1952 |
| 499,334 | France | 1920 |
| 676,519 | Great Britain | 1952 |
| 1,110,895 | France | 1956 |